United States Patent
Farver et al.

(10) Patent No.: US 11,416,510 B2
(45) Date of Patent: Aug. 16, 2022

(54) SYSTEMS AND METHODS FOR APPLYING LIFECYCLE PROCESSES TO DIGITAL DATA OBJECTS UTILIZING DISTRIBUTED LEDGER TECHNOLOGY AND ARTIFICIAL INTELLIGENCE

(71) Applicant: KPMG LLP, New York, NY (US)

(72) Inventors: Matthew M. Farver, New York, NY (US); David R. Jarczyk, Chicago, IL (US); Steve Rainey, Vienna, VA (US); Brad Brown, Los Angeles, CA (US)

(73) Assignee: KPMG LLP, New York, NY (US)

( * ) Notice: Subject to any disclaimer, the term of this patent is extended or adjusted under 35 U.S.C. 154(b) by 687 days.

(21) Appl. No.: 16/380,434

(22) Filed: Apr. 10, 2019

(65) Prior Publication Data

US 2020/0327137 A1    Oct. 15, 2020

(51) Int. Cl.
*G06F 16/30* (2019.01)
*G06F 16/25* (2019.01)
*G06N 20/00* (2019.01)
*G06F 16/18* (2019.01)
*G06F 16/245* (2019.01)

(52) U.S. Cl.
CPC ........ *G06F 16/254* (2019.01); *G06F 16/1805* (2019.01); *G06F 16/245* (2019.01); *G06N 20/00* (2019.01)

(58) Field of Classification Search
CPC .. G06F 16/1805; G06F 16/245; G06F 16/254; G06F 16/9024; G06F 21/64; G06N 20/00; G06N 20/10; G06N 20/20; G06N 3/006; G06N 5/003; G06Q 20/02; G06Q 20/1235; G06Q 2220/00
See application file for complete search history.

(56) References Cited

U.S. PATENT DOCUMENTS

| | | | |
|---|---|---|---|
| 2009/0083306 A1* | 3/2009 | Sichi | G06Q 10/00 |
| 2018/0131765 A1 | 5/2018 | Puleston et al. | |
| 2018/0173774 A1 | 6/2018 | McPherson et al. | |
| 2018/0285996 A1 | 10/2018 | Ma | |
| 2018/0307859 A1 | 10/2018 | LaFever et al. | |
| 2018/0322945 A1* | 11/2018 | Wolniewicz | G16H 50/50 |
| 2019/0012249 A1 | 1/2019 | Mercuri et al. | |
| 2019/0392285 A1* | 12/2019 | Manaharlal Kakkad | G06F 40/30 |
| 2020/0089672 A1* | 3/2020 | Velisetti | H04L 67/1091 |

(Continued)

OTHER PUBLICATIONS

Article entitled "Verify e-Documents with Smart Contracts in Azure Blockchain Development Kit", by Tempesta, dated Mar. 2019 (Year: 2019).*

(Continued)

*Primary Examiner* — Mahesh H Dwivedi
(74) *Attorney, Agent, or Firm* — Hunton Andrews Kurth LLP

(57) ABSTRACT

Systems and methods disclosed herein provide for applying lifecycle processes to digital data objects utilizing blockchain and artificial intelligence. Embodiments of the systems and methods provide for interacting with a digital data object from a variety of different source systems as well as dynamically modifying particular attributes associated with the digital data objects based on real-time information and/or user-specified requirements.

17 Claims, 7 Drawing Sheets

(56) References Cited

U.S. PATENT DOCUMENTS

2020/0134189 A1\* 4/2020 Carter .................. G06F 21/577
2020/0341951 A1\* 10/2020 Oberhofer ............. G06F 16/212

OTHER PUBLICATIONS

International Searching Authority, PCT International Search Report and Written Opinion, International Application No. PCT/US20/27578, dated Jul. 6, 2020, pp. 1-10.

\* cited by examiner

FIG. 3A

Predetermined Key : Value Data Object
Example:
{
Key A:  Value A,
Key B:  {
   Key B1: Value B1,
   Key B2: Value B2,
   Key B3: Value B3
},
Key C : Value C
}

FIG. 3B

Predetermined Key : Value Data Object
Example:
{
Existing Key A:  Existing Value A,
Existing Key B:  {
   New Key B1: New Value B1,
   New Key B2: New Value B2,
   New Key B3: New Value B3
},
Existing Key C : Existing Value C
}

FIG. 5B

```
Goal-Based AI Agent  35
Function (a, S, P, m) {
            a_i = Action_Function (a, m)
            s_i = Update_State_Function (a_i, S)

while (True) {
                 goal = Policy/Goal_Function (P, s_i)
                 if (goal == True)
                          submit modified object to the blockchain
                             break
                     m_j = New_Object_Modifier_Function (a_i, m_i, s_i, P)
                     a_j = Action_Function (a_i, m_j)_j
                     s_i = Update_State_Function (a, S)
            }
}
        35a
Action_Function (a, m){
     a_i = Apply m criteria to a
     return a_i
}
        35b
Update_State_Function (a_i, S){
    s_i = Apply a_i to S
    return s_i
}
        35c
Policy/Goal_Function (P, s_i){
    if (P = s_i){
    return True
    } else {
    return False
}
        35d
New_Object_Modifier_Function (a_i, m_i, s_i, P){
            Given the Difference (Delta) between P and s_i ⟶ Adjust m_i
            return m_j
}
```

SYSTEMS AND METHODS FOR APPLYING LIFECYCLE PROCESSES TO DIGITAL DATA OBJECTS UTILIZING DISTRIBUTED LEDGER TECHNOLOGY AND ARTIFICIAL INTELLIGENCE

FIELD OF THE INVENTION

The present invention relates generally to the lifecycle of digital data objects, and more particularly to a system and method for applying lifecycle processes to the digital data objects utilizing distributed ledger technology and artificial intelligence.

BACKGROUND

Currently, tangible assets (e.g., physical goods) may be tracked with the help of barcode labels (e.g., by scanning the label) or Global Positioning System (GPS), Bluetooth Low Energy (BLE), or radio-frequency identification (RFID) tags (e.g., by receiving the broadcast of the tag's location) attached to the objects. Further, intangible assets (e.g., software as a service or other IT services) may be tracked by identifying when and where a software system or application is accessed by an end-user through system logins, or by a unique data object such as a license key attached to a software application, or by embedding a unique data identifier into the intangible asset that is required to transfer the intangible asset from one party to another. Additionally, tangible and intangible assets may be tracked by subscribing to data transactions emanating from multiple data systems as the assets migrate across an organization's technology infrastructure. Further, certain assets may be tracked with the help of distributed ledger technologies, i.e., blockchain. However, any additions or modifications to the blockchain must be made in a format native to the blockchain. As such, if an asset interacts with a variety of separate systems during its lifecycle, the separate systems will not be able to store the asset's information on the same blockchain unless those systems operate in the format native to that blockchain. In addition, such systems also fail to take into consideration how certain real-time information or user-specified requirements may affect a particular attribute associated with the asset. For example, a tangible asset's price may need to change based on certain real-time information (e.g., weather, geo-political events, stock market, company financials, etc.) or user-specified requirements (e.g., company wants to directly modify the price). Without the ability to dynamically modify the asset's price (or another attribute), the price will only be reflective of stale information that is likely not tailored to the particular user.

It would be desirable, therefore, to have a system and method that could overcome these and other deficiencies of known systems.

SUMMARY

According to an embodiment, the invention relates to computer-implemented systems for applying lifecycle processes to digital data objects. For example, the system may comprise: an extract, transform, and load (ETL) layer including a plurality of input application programming interfaces (APIs) and a plurality of blockchain representational State Transfer (REST) APIs; and a blockchain including a plurality of nodes and a plurality of corresponding cryptographically-verified ledgers, wherein the plurality of corresponding cryptographically-verified ledgers are identical. The plurality of input APIs may be configured to: (i) receive inputs associated with the digital data object from a plurality of data source systems, wherein one or more of the data source systems are different and (ii) extract metadata and the data payloads from the inputs. Further, the plurality of blockchain REST APIs may be configured to: (i) generate at least one blockchain data object based on the extracted metadata and data payloads or modify at least one blockchain data object existing within the blockchain and (ii) load the at least one blockchain data object onto the blockchain. According to an embodiment, the system may also include an artificial intelligence (AI) module configured to modify at least one blockchain data object in the blockchain based at least in part on a user-identified goal and a machine learning engine.

The invention also relates to a computer-implemented method for applying lifecycle processes to digital data objects.

According to an embodiment, by utilizing the ETL layer, the system is able to interact with data types, e.g., digital data objects, from a variety of different source systems. Further, with the AI module, the system is provided with an ability to dynamically modify particular attributes associated with the digital data objects during its lifecycle based on real-time information and/or user-specified requirements.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3A depicts an example embodiment of a schema utilized to create a new blockchain data object.

FIG. 3B depicts an example embodiment of a schema utilized to add/modify an existing blockchain data object.

FIG. 5B depicts an example embodiment of the functions implemented by the AI module in FIG. 5A.

DETAILED DESCRIPTION OF EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments.

Figure 1:
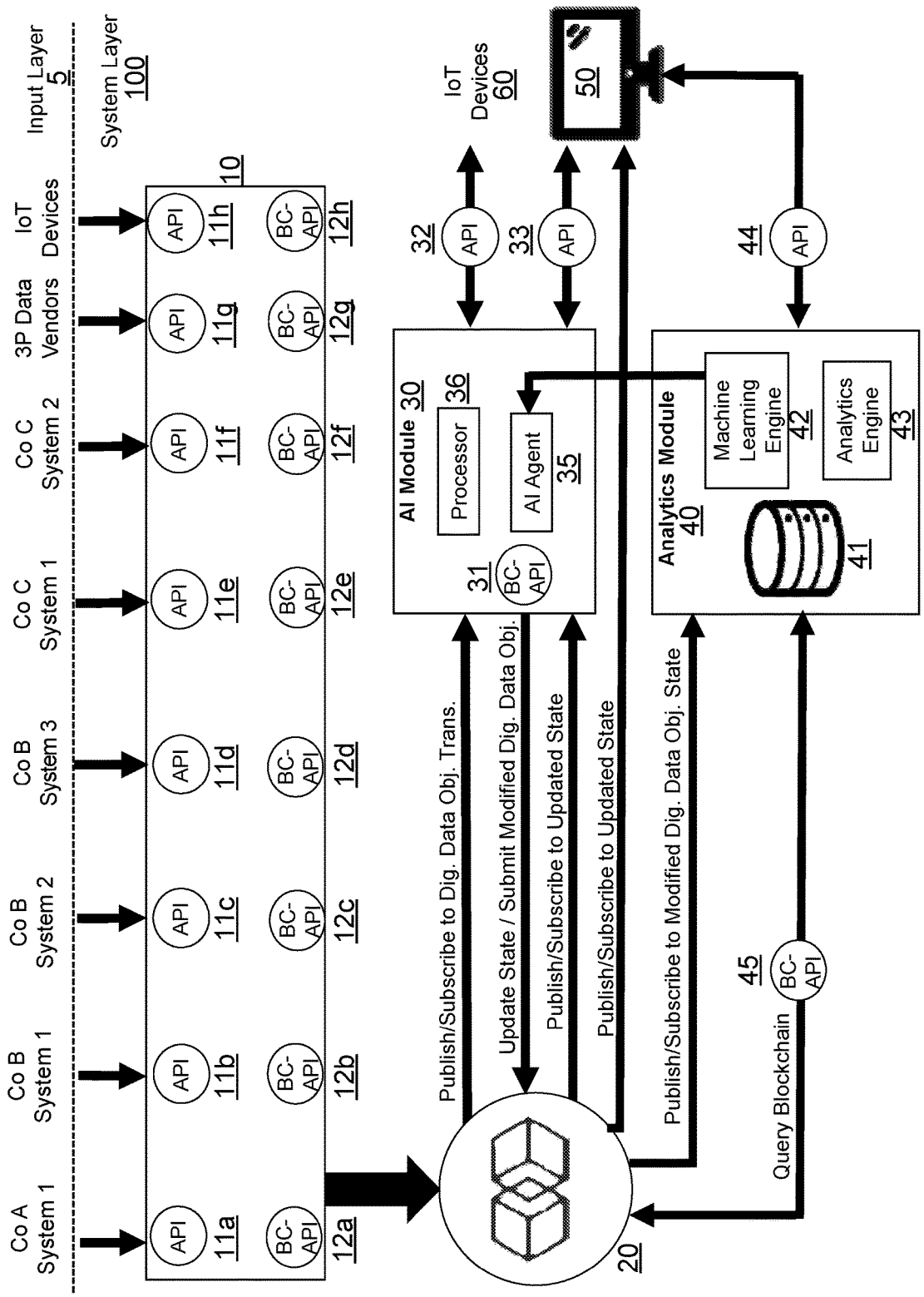
FIG. 1 is a functional diagram of a digital data object lifecycle system according to an exemplary embodiment of the invention.

FIG. 1 is a functional diagram of a digital data object lifecycle system according to an exemplary embodiment of the invention. According to an embodiment, the digital data object lifecycle system 100 includes an ETL layer 10, a blockchain 20, an AI module 30, an analytics module 40, and a client-end device 50.

As used herein, "digital data object" generally refers to a data point or data table that corresponds to and/or reflects attributes of assets (e.g., tangible, intangible, asset generating services), liabilities, receipts, expenditures, accruals, information (such as individual or entity identification information, geographical location information, employee timesheet data, email usage data (for customer service allocations), individual or entity location data, travel status, individual login/access activity, milestones, etc.) or other data types gathered in the general course of data generation for any purpose.

As depicted in the figure, the ETL layer 10 includes a plurality of input APIs 11a to 11h and a plurality of blockchain REST APIs 12a to 12h. According to an embodiment, each input API 11 may be associated with a different data source system, e.g., enterprise resource planning (ERP), database (DB), data lake (DL), data warehouse (DW), customer-relationship management (CRM), Internet of things (IoT) devices, spreadsheets, etc. For example, API 11a may be associated with an ERP system, while API 11b may be associated with a DB system. Further, the data source systems may be associated with either the same or different companies at the input layer 5. For example, API 11a may be associated with system 1 of Company A, API 11b may be associated with system 1 of Company B, API 11c may be associated with system 2 of Company B, API 11d may be associated with system 3 of Company B, API 11e may be associated with system 1 of Company C, API 11f may be associated with system 2 of Company C, API 11g may be associated with third-party data vendors, and API 11h may be associated with at least one IoT device. According to an embodiment, each input API 11 receives incoming metadata and the data payload from the corresponding data source systems at the input layer 5. In particular, the input APIs 11 extract a predefined number of attributes from the incoming data's metadata. The extracted metadata attributes may include data source and type identifiers such as at least one timestamp associated with the incoming data, an identifier of the company and/or system transmitting the data and identifiers of the data type and size, etc. Then, based on the extracted metadata attributes, the input APIs 11 may identify how the data payload is passed to the corresponding blockchain APIs 12 in order to transform the data payload into a format native to the blockchain 20 and then load the transformed data payload into the blockchain 20. According to an embodiment, input API 11a may be associated with blockchain API 12a, input API 11b may be associated with blockchain API 12b, input API 11c may be associated with blockchain API 12c, input API 11d may be associated with blockchain API 12d, input API 11e may be associated with blockchain API 12e, input API 11f may be associated with blockchain API 12f, input API 11g may be associated with blockchain API 12g, input API 11h may be associated with blockchain API 12h.

During the lifecycle (i.e., from creation to termination) of digital data objects, the corresponding attributes (e.g., amount, location, ownership, source, value, etc.) may change many times. For a variety of analysis and compliance reasons (e.g., classification of transactions for trade & customs, transaction tax, and other indirect taxes; characterization and analysis of transactions, including receipts and expenditures inclusive of cross jurisdictional transactions (e.g., amounts, including price, receipts, expenditures, and accruals); information reporting purposes (e.g., identifying information for individuals and entities, geographical location information, and associated tax reporting data); matching and reconciliation of data from disparate sources, etc.), it is important to keep track of a digital data object at each stage of its lifecycle. According to an embodiment, each of the inputs at the input layer 5 may correspond to a different stage or "event" of a digital data object's lifecycle. For example, assuming the digital data object corresponds to a tangible component, the component may first originate at Company A and may then be transferred through the different systems of Companies B and C, as well as the third party data vendors and/or IoT devices According to an embodiment, the system 100 can keep track of the component via its digital data object and, therefore, apply specific processes to it during its entire lifecycle.

According to an embodiment, the blockchain 20 may also publish transactions to the AI module 30 (after the A module 30 subscribes to the blockchain 20) in order to incorporate real-time information to modify at least one of the digital data object's attributes with a user-defined goal or a goal defined by a technology system such as an IoT device 60. The AI module 30 is able to provide, in real-time, the desired digital data object attribute outcome by implementing a goal-based AI agent 35. However, in another embodiment, other AI agents may also be implemented. Further, the blockchain 20 may publish to the AI module 30 with the use of a real-time, full-duplex communication channel, e.g., the WebSocket or WebHook communications protocol. According to another embodiment, other communication protocols may also be used. By publishing to the A module 30, the blockchain 20 will be able to receive real-time updates and modifications for the published blockchain data. In particular, the AI module 30 can submit the modified digital data object back to blockchain 20 via a blockchain REST API 31; this action will cause the blockchain 20 to update the state of the blockchain 20 and its corresponding cryptographically-verified ledger 21 with the updated digital data object information. The updated blockchain 20 state may then be provided back to the AI module 30 for future processing. Further, the AI module 30 may receive information from IoT devices 60 via an API 32 and receive particular user-specified requirements from the client-end device 50 via an API 33. The API 33 lets the end user modify or set the state policy/goal criteria of the AI module 30 to meet an intended outcome of a specific digital data object lifecycle process. For example, a company may want its legal entities to maintain specific financial measures when applying compliance rules to digital data objects. The API 32 is also intended to modify or set the state policy/goal criteria of the AI module 30, however this information is relayed to the AI module 30 via an IoT device 60. Further, the AI module 30 may also include a processor 36 in order to answer specific questions from the end user.

According to an embodiment, the blockchain 20 may interact with an analytics module 40 and the client-end device 50 to provide analytics on the data stored on the blockchain 20. In particular, a user utilizing the client-end device 50 may query the analytics module 40 (via API 44) to query the blockchain 20 (via blockchain REST API 45) for particular data stored in the blockchain 20. The API 44 lets the end user define the parameters that they wish to query the blockchain 20. Parameters may include a date range, digital data object type or any other information stored within the blockchain 20. Further, as depicted in the figure, the analytics module 40 includes databases 41, a machine learning engine 42, and an analytics engine 43.

Figure 2:
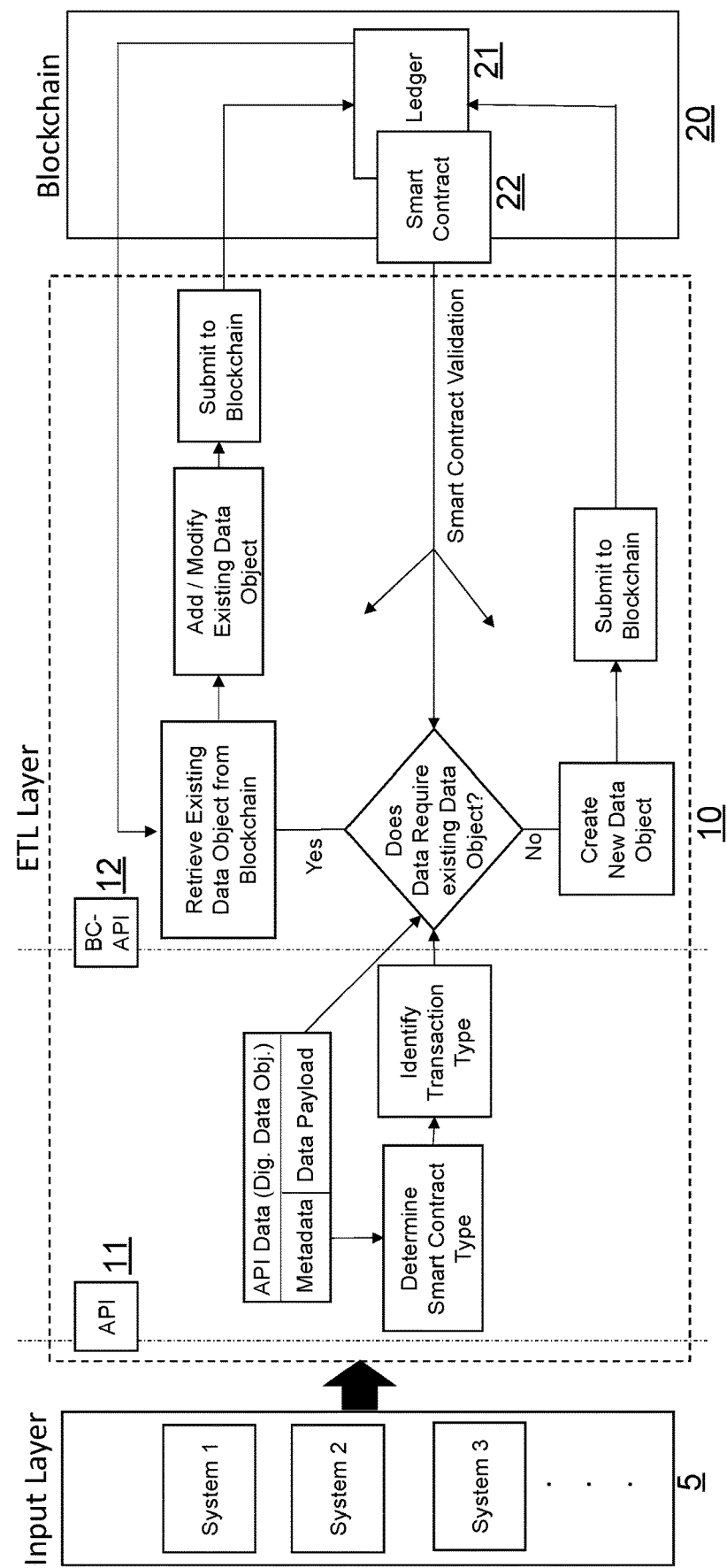
FIG. 2 depicts an example embodiment of the functional interaction between the input layer, the ETL layer, and the blockchain in the digital data object lifecycle system of FIG. 1.

FIG. 2 depicts an example embodiment of the functional interaction between the input layer, the ETL layer, and the blockchain in the digital data object lifecycle system of FIG. 1. According to an embodiment, after the ETL layer 10 receives incoming data from the input layer 5, it then utilizes the incoming data's metadata to identify the smart contract 22 and the transaction type to be executed. In particular, the APIs 11 may implement one of polling API calls, REST Hooks, WebHooks, or WebSockets to listen for or identify new digital data object transactions at the different data source systems (e.g., ERP, DB, DL, DW, CRM, IoT devices, spreadsheets, etc.) in the input layer 5. Then, after identifying the new data object transactions in one or more of the data source systems, the corresponding API(s) 11 (e.g., APIs 11a to 11h) may access and identify the metadata and data payload associated with the digital data object.

The API(s) 11 may then compare the identified metadata against predetermined rules to identify which smart contract 22 should be accessed. Smart contracts 22 are computer protocols that execute when predefined conditions occur. Each smart contract 22 serves a specific digital data object lifecycle purpose for a variety of compliance reasons (e.g., trade and customs duty drawbacks, international tax, federal tax, state tax, transfer pricing, and intercompany transactions for tangible assets, intangible assets, and services). For example, if the metadata indicates that the data is coming from a customs broker, a smart contract 22 developed for a customs compliance reason will be selected. Additionally, each smart contract 22 may have many different types of transactions that require different lifecycle processes to be applied to the digital data object. The metadata from API 11 can then be utilized to identify the specific transaction type that will be executed. Once the smart contract 22 transaction type is identified, the data payload from API 11 is submitted into the blockchain API 12.

Within the transaction of the smart contract 22, predetermined logic will determine if the digital data object within the data payload exists within the blockchain 20 or if a blockchain data object will need to be created. If the smart contract 22 requires that a new blockchain data object be made, then the corresponding blockchain API 12 will create the new data object and submit it to the blockchain 20. FIG. 3A depicts an example embodiment of a schema utilized to create the new blockchain data object. According to an embodiment, the blockchain data object may include certain data attributes associated with the corresponding digital data object, e.g., data source and type identifiers such as one or more timestamps associated with the incoming data, an identifier of the company and/or system transmitting the data and identifiers of the data type and size, etc. If, however, the smart contract 22 requires that data be added to an existing blockchain data object, then the corresponding blockchain API 12 will need to first pull that data from the blockchain 20, modify the data, and then submit the modified data back to the blockchain 20. FIG. 3B depicts an example embodiment of a schema utilized to add/modify an existing blockchain data object. According to another embodiment, the predetermined logic within the transaction may also determine if the digital data object needs to be matched and/or reconciled with other relevant data. Then, depending on the determination, the digital data object may be matched and/or reconciled with the other relevant data.

Figure 4:
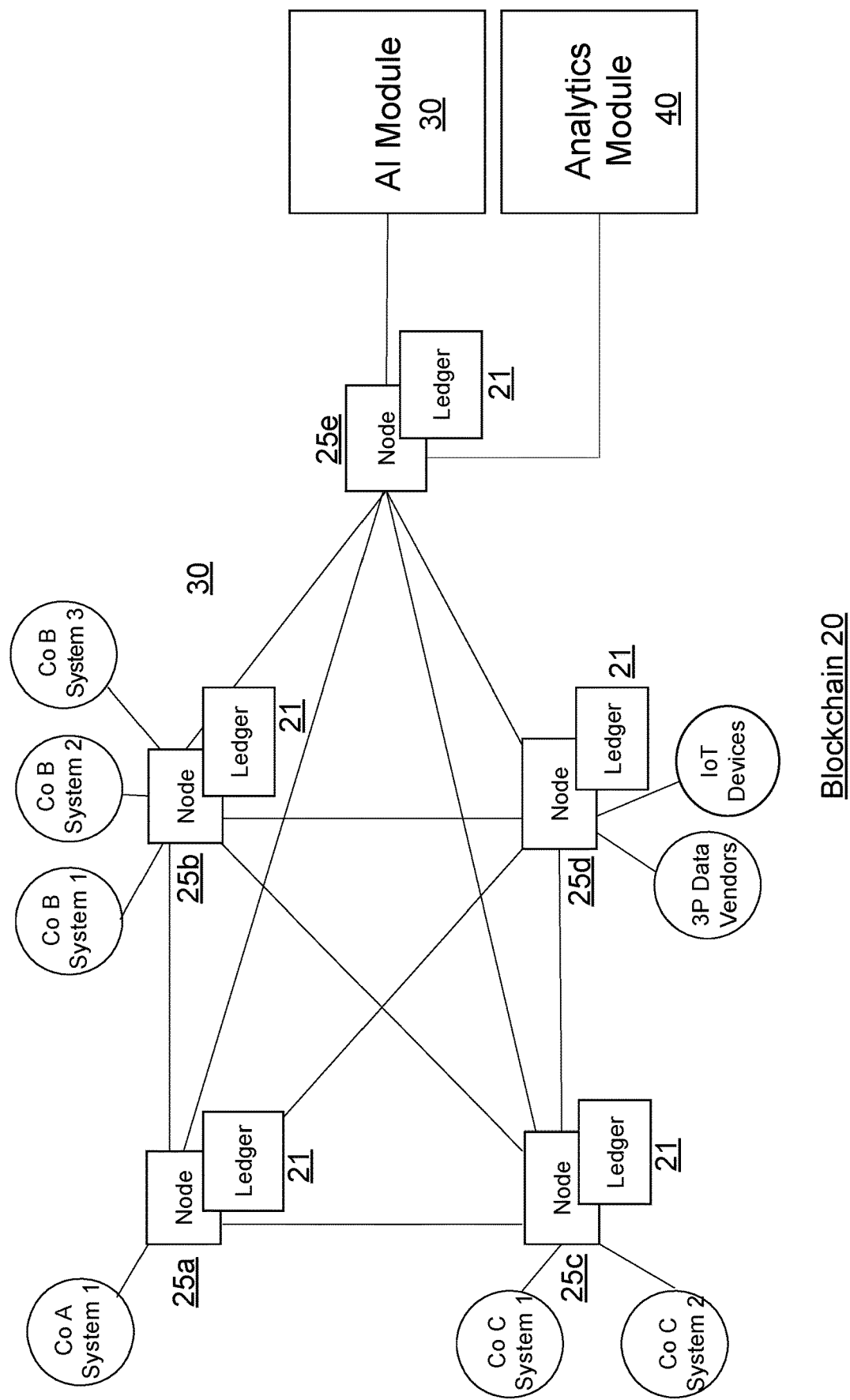
FIG. 4 depicts an example embodiment of a distributed ledger system in the blockchain of FIG. 1.

FIG. 4 depicts an example embodiment of a distributed ledger system in the blockchain of FIG. 1. As depicted in the figure, the blockchain 20 includes a plurality of nodes 25, with each node 25 being associated with a cryptographically-verified corresponding ledger 21. With the blockchain 20, the digital data object's origin, chain of possession, and modifications can be tracked, traced, and presented chronologically in the cryptographically-verified ledger 21 to each participant of the blockchain, e.g., nodes 25. In particular, each digital data object lifecycle process "event" may be considered a transaction, with the corresponding data being written on the chain as a new block. According to an embodiment, each node may comprise one or more computer servers which provide processing capability and memory storage. Node 25a may be associated with inputs from the systems of Company A, i.e., System 1. Node 25b may be associated with inputs from the systems of Company B, i.e., Systems 1, 2, and 3. Node 25c may be associated with inputs from the systems of Company C, i.e., Systems 1 and 2. Node 25d may be associated with inputs from the third-party data vendors and/or IoT devices. Lastly, node 25e may be associated with inputs from the AI module 30 and the analytics module 40. Further, according to an embodiment, the node 25e may act as a blockchain governor for the blockchain 20. In other words, the node 25e may be utilized to (i) set up the configuration for each of the other nodes 25, (ii) maintain the permissions of each of the nodes 25, (iii) add additional nodes, and (iv) add or delete smart contracts associated with the nodes 25. Any changes made by any of the nodes 25a to 25e to a corresponding ledger 21 will be automatically reflected in every other ledger 21 in the blockchain 20. As such, with the distributed ledger system in the blockchain 20, provenance may be provided with the dissemination of identical copies of the ledger 21, which has cryptographic proof of its validity, to each of the nodes 25a to 25e.

Figure 5A:
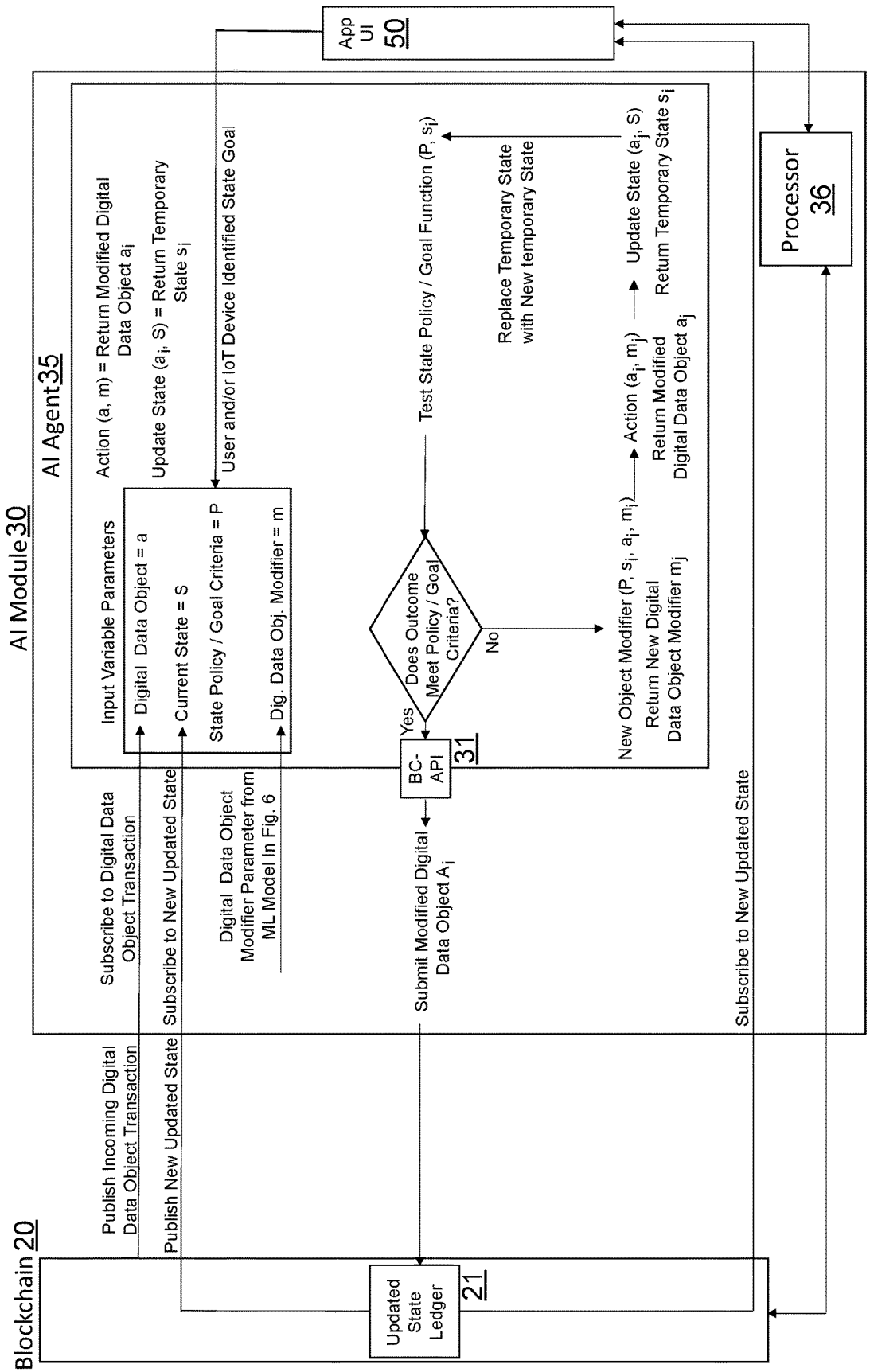
FIG. 5A depicts an example embodiment of the functional interaction between the blockchain, the AI module, and the client-end device in the digital data object lifecycle system of FIG. 1.

FIG. 5A depicts an example embodiment of the functional interaction between the blockchain, the AI module, and the client-end device in the digital data object lifecycle system of FIG. 1. As described above, the blockchain 20 publishes to the AI module 30 in order to incorporate real-time information provided by the goal-based AI agent 35. In particular, the goal-based AI agent 35 attempts to reach and/or maintain a state policy/goal criteria that is pre-defined by an end-user on a dashboard application on the client-end device 50 or by information supplied by IoT device 60. Further, the AI agent 35 may take in four variable parameters: (i) new digital data object transaction input from the blockchain 20, (ii) a user-identified state policy/goal from the client-end device 50, and/or an IoT identified goal from the IoT devices 60, (iii) the last-known state from the blockchain 20, and (iv) the digital data object modifier from the machine learning engine 42.

Further, as depicted in FIG. 5B, the AI agent 35 may be comprised of four functions: (i) an action function (i.e., function 35a) which takes in the new digital data object transaction input and the digital data object modifier, and returns a new modified digital data object, (ii) an update state function (i.e., function 35b) that takes in the modified digital data object and the current state from the blockchain 20, and returns a modified temporary state, (iii) a test state policy/goal function (i.e., function 35c) that takes in the user and/or IoT device identified state goal and the modified temporary state, compares the modified temporary state against the user and/or IoT device identified goal, and returns a true or false Boolean value, and (iv) a new digital data object modifier function (i.e., function 35d) that takes in the user and/or IoT device identified state goal, the modified temporary state, the modified digital data object, and the digital data object modifier, and returns a new digital data object modifier.

According to an embodiment, the AI agent 35 can have multiple goals and states, which can be tracked by the blockchain 20. In particular, because the blockchain 20 provides a fully observable and static environment, all the different types of states within the blockchain 20 may be known at any time. For example, given a set of relevant transactions, a blockchain can maintain the current state of financials for multiple entities at once (e.g., revenue, expenses, profit margin, etc.). Additionally, the state of every single blockchain data object may also be known at any time. For example, a blockchain data object state can include its location, current price, or any other attribute associated with the blockchain data object. As such, because all of the states of all of the data collected within the blockchain may be known at all times, an end user can identify many specific goals for each individual state. In addition, to achieve those goals, a user can adjust individual data attributes during each transaction. For example, a blockchain monitoring a single organization's subsidiaries will know the state of the subsidiaries' financials at all times. Further, given a user-identified set of goals for each subsidiary, business processes applied to each of the digital data objects can be modified accordingly to meet the user-identified goals for each subsidiary as the lifecycle of the digital data objects migrate across the organization's supply chain. However, modification of a digital data object attribute may at times require an initial starting value to modify the specific digital data object attribute. A supervised learning classification or regression algorithm can be applied to predict the best starting value for a digital data object attribute; this value may act as the initial digital data object modifier in the AI agent 35.

According to an embodiment, as depicted in FIG. 5A, the AI agent 35 may submit the new digital data object transaction input and the digital data object modifier into the action function, which modifies the digital data object. According to an embodiment, if the digital data object modifier is a price that the incoming digital data object is estimated to be priced at (e.g., by the machine learning engine 42), the action function will modify and attach that new price to the digital data object, and will return the new modified digital data object to the AI agent 35. The new modified digital data object and the current state from the blockchain 20 will then act as the parameters for the update state function, which apply the new modified digital data object to the current state. In particular, the update state function identifies how the modified digital data object affects the current state of the blockchain 20, and returns a new temporary state. The new temporary state is then compared with the user and/or IoT device identified state goal and returns a true or false Boolean value in the test state policy/goal function. If the test state policy/goal function returns true, indicating that the state policy/goal criteria has been met, the AI agent 35 will submit the new modified digital data object to the blockchain 20. The blockchain 20 will then update the state in the ledger 21. Then, the updated state may be provided to the AI agent 35 as the new current state. Similarly, the new current state may also be provided to the client-end device 50. If the state policy/goal function returns false, the new digital data object modifier function is activated with parameters including the new modified digital data object, the digital data object modifier, new temporary state, and the user and/or IoT device identified state goal. The new digital data object modifier function determines the delta (i.e., difference) between the user and/or IoT device identified state goal and the new temporary state, and adjusts and returns a digital data object modifier variable, which is then fed back into the action function such that the process repeats until the state policy/goal function returns true.

Further, as described above, the AI module 30 may utilize other different types of AI agents, e.g., reflex-based agents and utility-based agents. Reflex-based AI agents may be utilized to provide outcomes to specific conditions specified from a user, e.g., whether a particular digital data object's attribute complies with a certain policy or regulation. According to an embodiment, the specific condition may be received from the client-end device 50 and provided to the processor 36. The processor 36 may then analyze the specific condition and the digital data object to determine an outcome. Specifically, based on analysis of the values (e.g., numbers or strings) included in the conditions, the processor 36 may (i) retrieve additional information required to answer the condition (e.g., the certain policy or regulation included in the question), (ii) analyze the condition in view of the retrieved additional information, and (iii) provide an outcome to the specific condition (e.g., true or false Boolean value). The AI module 30 may then update the ledger 21 based on the outcomes from the conditions in processor 36. A utility-based AI agent may add a utility function to the goal-based AI agent described above. In particular, the utility-based AI agent may be used as a performance measure of how well the AI agent 35 is achieving the state policy/goal criteria. For example, an attribute of a digital data object may take a range of values that would all satisfy the state policy/goal criteria established; however, there may be values that provide better precision for the state policy/goal criteria than others. The utility-based AI agent can measure this precision and modify the digital data object accordingly to better meet the state policy/goal criteria.

Figure 6:
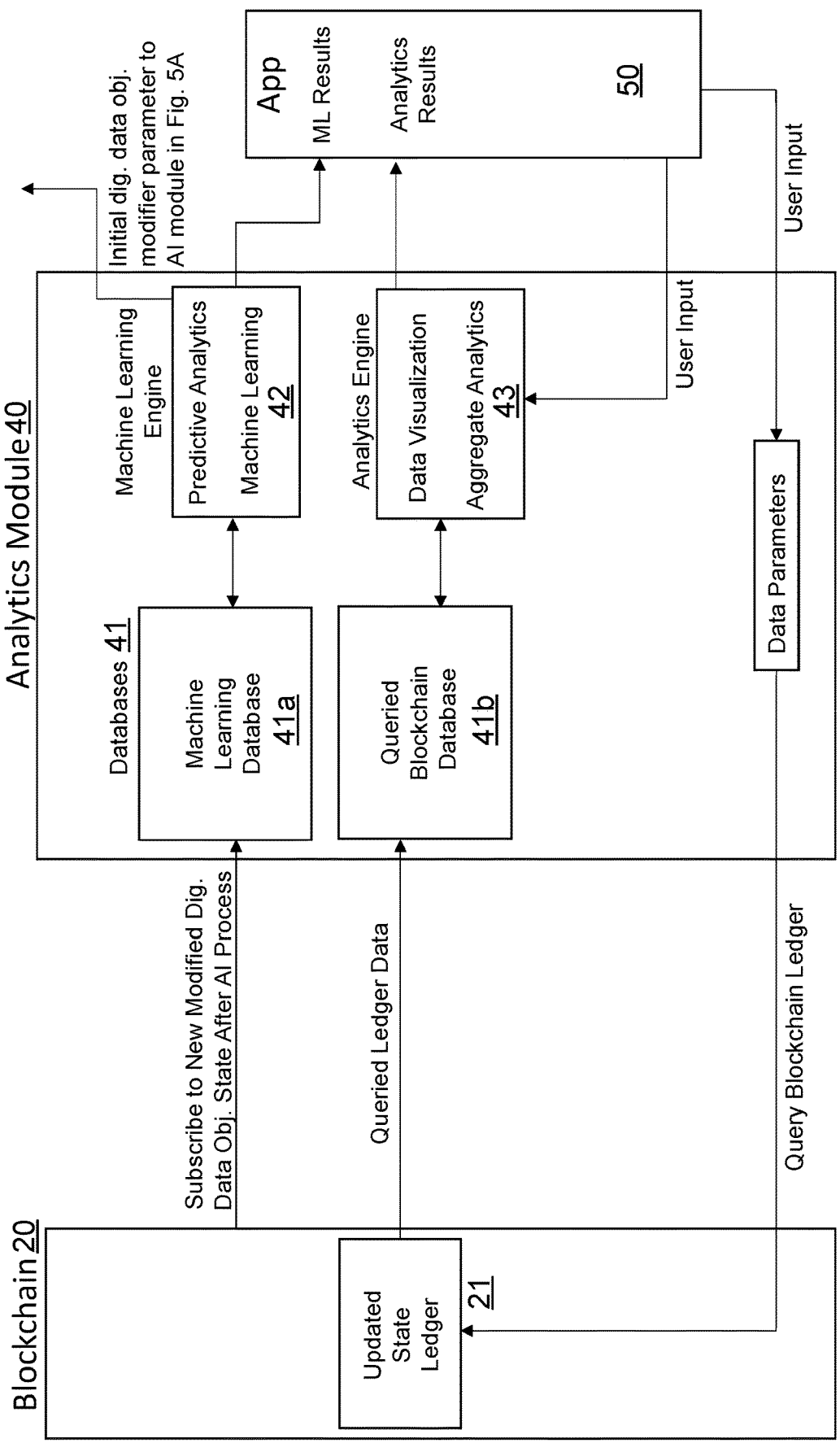
FIG. 6 depicts an example embodiment of the functional interaction between the blockchain, the analytics module, and the client-end device in the digital data object lifecycle system of FIG. 1.

FIG. 6 depicts an example embodiment of the functional interaction between the blockchain, the analytics module, and the client-end device in the digital data object lifecycle system of FIG. 1. As described above, a user utilizing the client-end device 50 may query the blockchain 20, via the analytics module 40, for particular data stored in the blockchain 20. According to an embodiment, the analytics module 40 includes databases 41, a machine learning engine 42, and an analytics engine 43. Further, as depicted in the figure, the databases 41 include a machine learning database 41a and a queried blockchain database 41b. As regards to analytics, a user can select, with the dashboard application on the client-end device 50, a data range and data parameters to include in the query to the blockchain 20. The blockchain 20 will then push the queried blockchain data to the analytics module 40, where it can be stored in the queried blockchain database 41b. According to an embodiment, the analytics engine 43 may then perform a variety of analytics on the queried blockchain data stored in the queried blockchain database 41b. The analytics results may then be output to the dashboard application on the client-end device 50, where the results are displayed to the user.

In addition, predictive analytics may also be performed on the blockchain data. In particular, after a digital data object is updated in the AI module 30 (see FIG. 5A), the resulting blockchain data may be published to the machine learning database 41a. The machine learning engine 42 may then use the data stored in the machine learning database 41a to populate a machine learning model to predict the initial value of the digital data object modifier. Depending on the type of value being predicted, a supervised classification algorithm such as a decision tree or support vector classification can be implemented for categorical (discrete) values, or, if the value being predicted is a nominal (continuous) value, a regression-based algorithm such as support vector regression or other multiple regression algorithms can be utilized. According to another embodiment, other supervised machine learning algorithms may also be utilized. Further, to determine the initial modification value, machine learning principles can be leveraged by (i) subscribing to the blockchain 20 to listen for that particular digital data object transaction, (ii) building a historical data set of all the past modifications to the digital data object and its corresponding attributes, and (iii) running the above-discussed machine learning algorithms against the historical data set to predict the initial digital data object modification value for the AI module 30. The machine learning engine 42 may then push the predicted value to the AI module 30. The machine learning engine 42 may also push the machine learning results to the dashboard application on the client-end device 50, where the results can be displayed to the user.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The system described above can be implemented with servers and other computing devices in various configurations. The various servers and computing devices may use software to execute programs to execute the methods described above. Various embodiments of the invention also relate to the software or computer readable medium containing program instructions for executing the above described methods to perform digital data object lifecycle tracking via the ETL layer 10, the blockchain 20, the AI module 30, the analytics module 40, and the client-end device 50.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A digital data object lifecycle system, the system comprising:
    a processor configured to execute:
        an extract, transform, and load (ETL) layer including a plurality of input application programming interfaces (APIs) and a plurality of blockchain representational State Transfer (REST) APIs;
    a blockchain including a plurality of nodes and a plurality of corresponding ledgers, wherein:
        at least one of the plurality of input APIs is configured to:
            receive inputs associated with the digital data object from a plurality of data source systems, wherein one or more of the data source systems are different; and
            extract metadata from the inputs; and
        at least one of the plurality of the blockchain REST APIs is configured to:
            generate at least one blockchain data object based on the extracted metadata; and
            load the at least one blockchain data object onto the blockchain; and an artificial intelligence (AI) module, wherein the AI module is configured to modify the at least one blockchain data object in the blockchain based on a plurality of parameters, the plurality of parameters including: (i) a new transaction input from the blockchain, (ii) a user-identified goal from a client-end device, (iii) a last-known world state from the blockchain, and (iv) a digital data object modifier.

2. The system according to claim 1, wherein the generated at least one blockchain data object is one of (i) a new blockchain data object and (ii) a modified existing blockchain data object.

3. The system according to claim 2, wherein a smart contract determines whether the at least one of the plurality of the blockchain REST APIs should (i) generate the new blockchain data object or (ii) modify an existing blockchain data object.

4. The system according to claim 1, wherein the AI module is configured to modify the at least one blockchain data object in the blockchain based at least in part on information received from internet-enabled devices.

5. The system according to claim 1, wherein the AI module: (i) generates an outcome based on the received plurality of parameters, (ii) compares the outcome to the user-identified goal, and (iii) modifies the at least one blockchain data object in the blockchain based on the comparison.

6. The system according to claim 1, further comprising:
an analytics module including a plurality of databases, a machine learning engine, and an analytics engine, wherein the analytics module is configured to (i) store the at least one data object in at least one of the plurality of databases and (ii) perform analytics on the at least one data object stored in the at least one of the plurality of databases with at least one of the machine learning engine and the analytics engine.

7. The system according to claim 6, wherein one of the plurality of nodes is associated with the AI module and the analytics module.

8. The system according to claim 6, wherein the analytics module performs analytics on the at least one data object based on a query from a client-end device.

9. The system according to claim 6, wherein the machine learning engine is configured to (i) predict a digital data object modifier based on a machine learning model and (ii) provide the predicted digital data object modifier to the AI module.

10. The system according to claim 6, wherein results of the analytics are displayed on a client-end device.

11. The system according to claim 1, wherein the digital data object is associated with one of (i) a tangible asset and (ii) an intangible asset.

12. A digital data object lifecycle method, the method comprising:
receiving, with an extract, transform, and load (ETL) layer, inputs associated with the digital data object from a plurality of data source systems, wherein one or more of the data source systems are different;
extracting, with the ETL layer, metadata from the inputs;
generating, with the ETL layer, at least one blockchain data object based on the extracted metadata;
loading, with the ETL layer, the at least one blockchain data object onto a blockchain; and
modifying, with an artificial intelligence (AI) module, the at least one blockchain data object in the blockchain based on a plurality of parameters, the plurality of parameters including: (i) a new transaction input from the blockchain, (ii) a user-identified goal from a client-end device, (iii) a last-known world state from the blockchain, and (iv) a digital data object modifier.

13. The method according to claim 12, further comprising:
generating, with the AI module, an outcome based on the received plurality of parameters;
comparing, with the AI module, the outcome to the user-identified goal; and
modifying, with the AI module, the at least one blockchain data object in the blockchain based on the comparison.

14. The method according to claim 12, further comprising:
performing, with an analytics module, analytics on the at least one data object; and
displaying, with a client-end device, results of the analytics to a user.

15. The method according to claim 12, further comprising:
receiving, with the AI module, a specific question from a user on a client-end device; and
performing, with the AI module, an analysis of the specific question;
providing, with the AI module, an answer to the specific question based on the analysis.

16. The method according to claim 12, further comprising:
determining whether the digital data object needs to be matched with other relevant data based on a smart contract; and
matching the digital data object with the other relevant data based on the determination.

17. A digital data object lifecycle system, the system comprising:
an extract, transform, and load (ETL) layer;
a blockchain; and
an artificial intelligence (AI) module, wherein:
the ETL layer is configured to:
receive inputs associated with the digital data object from a plurality of data source systems, wherein one or more of the data source systems are different;
extract metadata from the inputs;
generate at least one blockchain data object based on the extracted metadata; and
load the at least one blockchain data object onto the blockchain; and
the AI module is configured to modify the at least one blockchain data object in the blockchain based at least in part on a plurality of parameters, the plurality of parameters including: (i) a new transaction input from the blockchain, (ii) a user-identified goal from a client-end device, (iii) a last-known world state from the blockchain, and (iv) a digital data object modifier.

* * * * *